Jan. 1, 1952   H. R. SCHLAGEL   2,580,704
AUTOMOBILE AWNING SUPPORT
Filed Oct. 25, 1947   2 SHEETS—SHEET 1
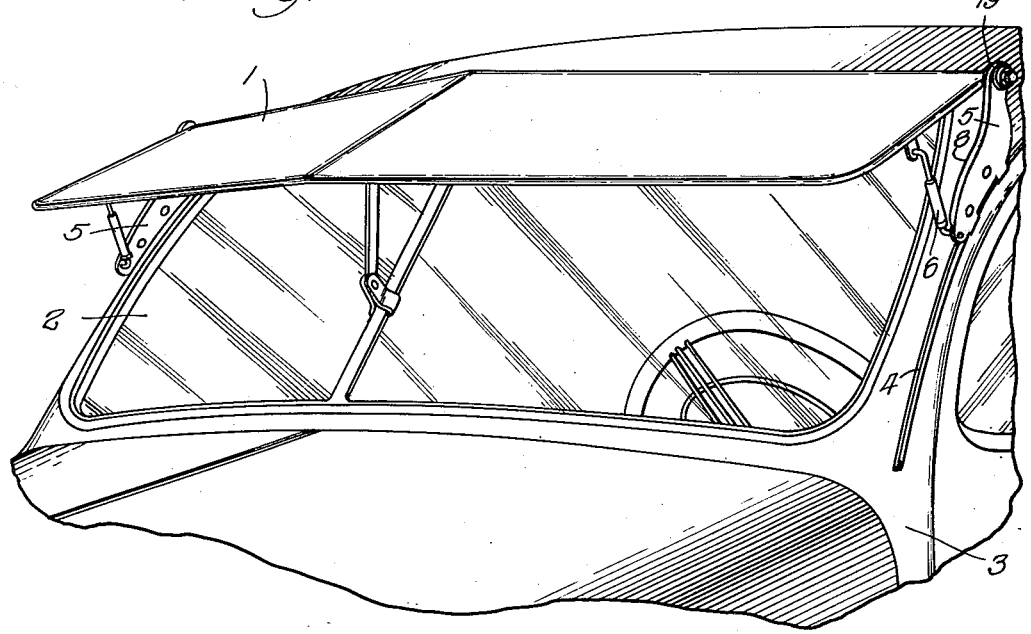
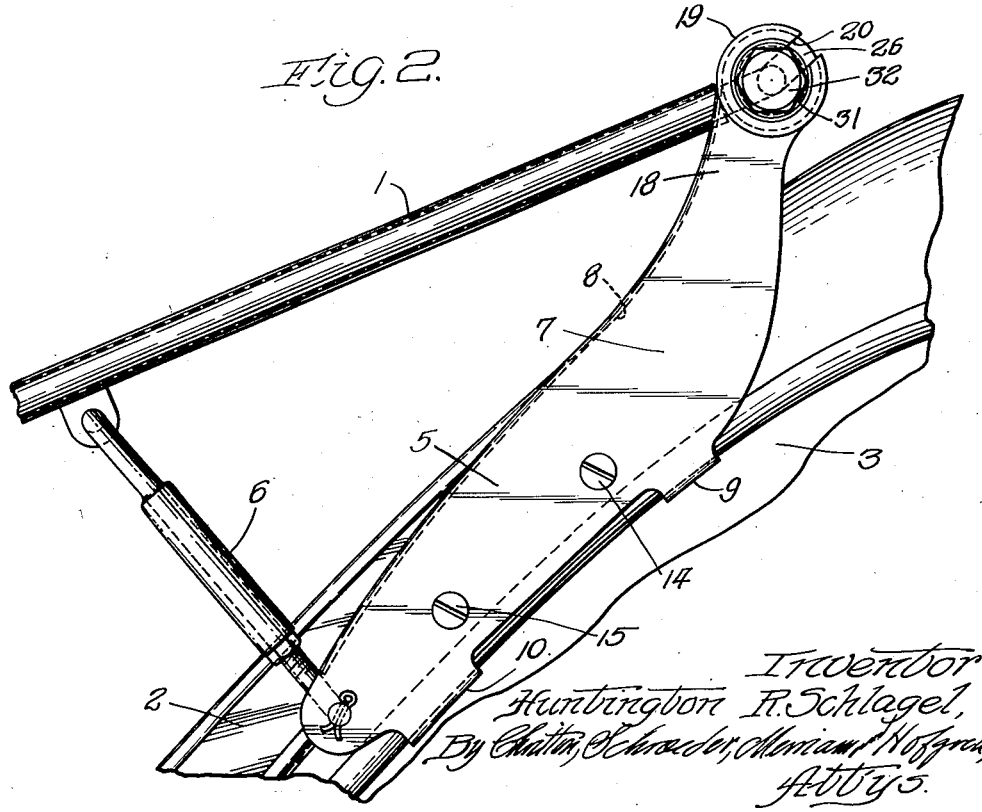
Inventor:
Huntington R. Schlagel, Jan. 1, 1952     H. R. SCHLAGEL     2,580,704
AUTOMOBILE AWNING SUPPORT
Filed Oct. 25, 1947     2 SHEETS—SHEET 2
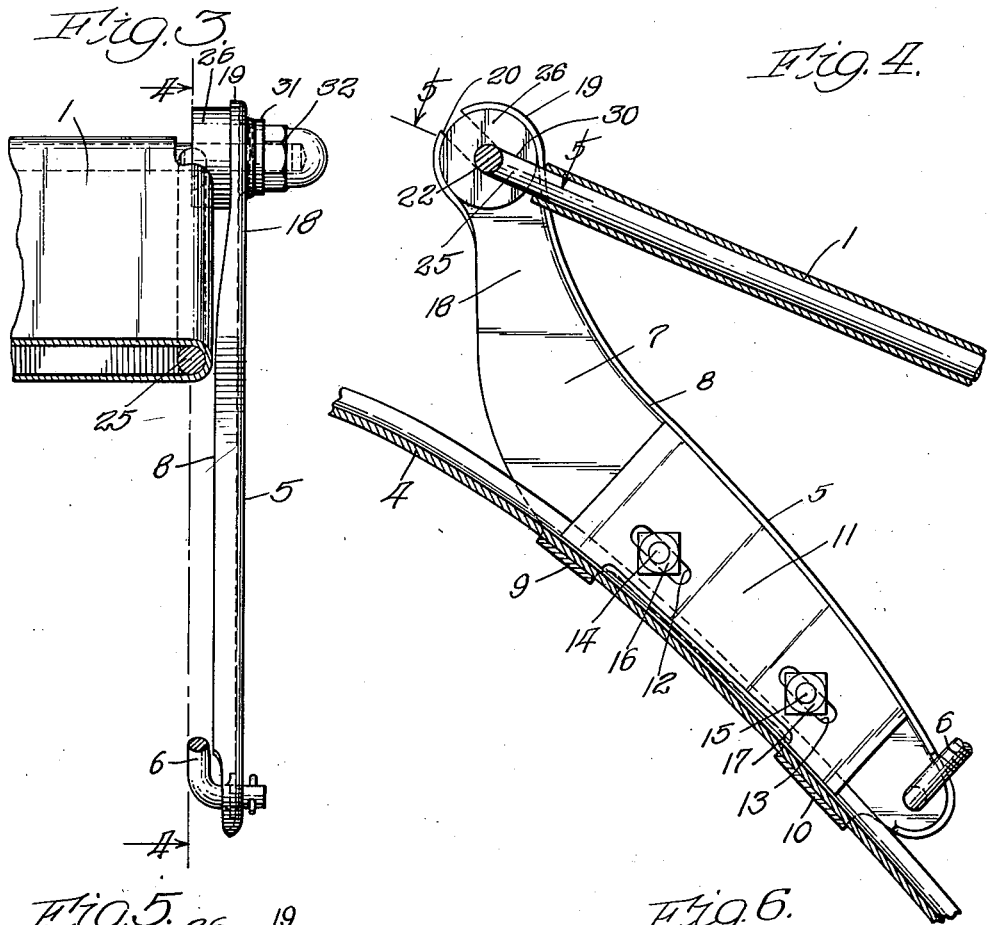
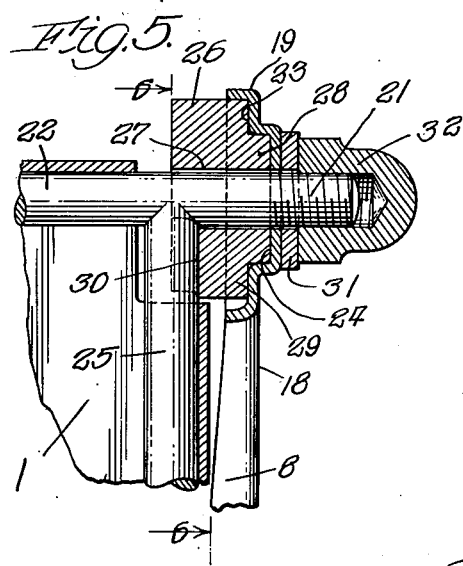
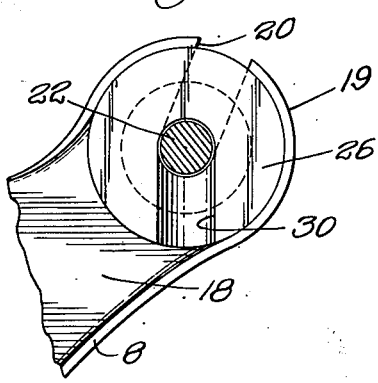
Inventor:
Huntington R. Schlagel,
By Chritton, Schroeder, Merriam & Hofgren
Attys.

Patented Jan. 1, 1952

2,580,704

UNITED STATES PATENT OFFICE 2,580,704

AUTOMOBILE AWNING SUPPORT

Huntington R. Schlagel, Des Plaines, Ill., assignor to Charles Peckat Manufacturing Company, Maywood, Ill., a corporation of Illinois Application October 25, 1947, Serial No. 782,074

6 Claims. (Cl. 248—278)

This invention relates to supporting means for supporting the awning for automobile wind shields, and more particularly to an improved support for enabling the awning to be adjusted as desired with relation to the wind shield.

This invention is an improvement over that shown in United States patent to Charles Peckat, 2,180,909, granted November 21, 1939, for "Awning for Automobiles," and that of the application of William A. Mueller and Walter Peckat, Serial No. 723,594, filed January 22, 1947, for "Awning for Automobiles," now Patent No. 2,541,271, dated February 13, 1951.

Among the objects of my invention are: to provide a novel and improved support for automobile awnings; to provide improved means for mounting the rear end corners of an automobile awning in the rear end of an improved form of side brackets; to provide in an automobile awning support an improved bracket having means for securing the same to a drain gutter, and novel means for supporting the awning on a pair of such brackets; to provide an automobile awning supporting bracket formed of sheet metal and having formed in its rear end a depression and a slot for receiving a collar on the rear rod of the awning; to provide a bracket of the type referred to having a pair of concentric depressions formed in its rear face for receiving a collar for preventing removal of the awning from a pair of these brackets until such removal is desired; to form a bracket having a slot and depression formed in its rear end and novel means for mounting the extending ends of the awning rear rod in said depression to prevent removal of the awning until desired but permit rotation of the awning with relation to a pair of these brackets; to provide a bracket having a slot for receiving an awning rod, and a depression for receiving a collar to prevent removal of the awning rod from the slot until desired; to provide an automobile awning support having a pair of brackets each of improved form, economical in manufacture, efficient in operation, universally fitting all makes of automobiles, and of ornamental appearance; and such further objects, advantages and capabilities as will later more fully appear.

My invention further resides in the combination, construction and arrangement of parts illustrated in the accompanying drawings, and while I have shown therein a preferred embodiment I wish it understood that the same is susceptible of modification and change without departing from the spirit of my invention.

In the drawings:

Fig. 1 is a fragmentary perspective view of the front portion of an automobile, and showing applied thereto an awning supporting means embodying my invention.

Fig. 2 is a fragmentary enlarged side elevation of the awning and its supporting means, looking directly toward the right hand side of the awning and supporting means as viewed in Fig. 1.

Fig. 3 is a fragmentary sectional view through the awning and the adjusting arm and looking downwardly upon the upper edge of one of the supporting brackets and associated parts.

Fig. 4 is a section on the line 4—4 of Fig. 3.

Fig. 5 is an enlarged transverse section on the line 5—5 of Fig. 4.

Fig. 6 is a section on the line 6—6 of Fig. 5.

In the form shown for illustrative purposes in the drawings, my improved supporting means is shown for supporting an awning 1 positioned at an appropriate angle above and forwardly of a windshield 2 of an automobile 3 having at each side of the windshield a drain gutter 4. Gripped upon the drain gutter at each side of the windshield is a bracket 5 having pivotally connected between the front end of the bracket and the side of the awning an adjusting member 6 of the type shown in said co-pending Application 723,594. Each of these brackets is secured to the drain gutter, one upon each side of the windshield, in the same general manner disclosed in said Peckat Patent 2,180,909, and said co-pending application. It is to be noted in Figs. 1, 2 and 4 that each of these brackets, which is formed of sheet steel, is provided with an elongated body portion 7 having along its upper edge on the inner face of the bracket a strengthening flange 8, and at longitudinal spaced positions along the lower edge of the bracket a pair of inwardly extending flanges 9 and 10. As seen in Fig. 4 these flanges 9 and 10 are formed on their inner faces upon the arc of a circle substantially equal to that of the curvature in the curved front portion of the drain gutter where the downward extending front portion merges into the rearwardly extending top portion of the drain gutter. This enables flanges 9 and 10 to be gripped in a secure manner to the drain gutter as later more fully described.

Slidably mounted on the inner face of the bracket 7 for longitudinal sliding movement with relation thereto is a plate 11 having a pair of longitudinally spaced slots 12 and 13 for slidably receiving stud bolts 14 and 15 which in turn are fixed to the body portion 7 of the bracket 5 and which stud bolts are provided at their inner ends with threaded ends for receiving nuts 16 and 17 for adjustably clamping the plate 11 against the inner side of the outwardly positioned edge of the drain gutter and the spaced flanges 9 and 10 on the outer underside of the drain gutter.

The body portion 7 of the bracket 5 has a rearwardly and upwardly extending neck 18 terminating in a head 19 formed with a radially extending slot 20 of a size to slidably receive the extending end 21 of the rear awning supporting rod 22. Only one of the brackets is being here described in detail as the one on the other side of the windshield is of identical structure except for being reversed in position. In other words a pair of these brackets will be of similar construction but one will be a right hand bracket and the other will be a left hand bracket. The inner face of the rear head 19 of the bracket has its metal stamped outwardly to form a pair of concentric depressions 23 and 24, the latter of which is of greater depth than the former. The slot 20 will extend inwardly along the outer wall of these depressions to a point slightly beyond the center of depression 24 so that when the extending end 21 of the awning rod 22 is slid laterally into the slot to its curved end it will stand concentric with depressions 23 and 24.

As will be seen in Fig. 5 the awning rear rod 22 is integrally formed with a forwardly extending side frame member 25 for supporting the sides of the awning. Mounted between the inner face of bracket head 19 and the awning side frame member 25 is a collar 26 formed with a round hole 27 for receiving the awning rear rod 22. Collar 26 on its right hand face as viewed in Fig. 5 is formed with an annular offset to provide one extending portion 28 to be seated in the deepest depression 24 and a portion 29 to be seated in the shallower depression 23. These surfaces 28 and 29 are cylindrical at their edges which edges seat into the complemental cylindrical walls of said depressions. At its inner face collar 26 is formed with a radially extending groove 30 to fit over the outer face of the awning side frame member 25 as will be understood in Figs. 5 and 6. Positioned on the outer face of the wall member of the deeper depression 24 is a metal washer 31 against which is gripped the adjacent face of a nut 32 threadably mounted upon the threaded end 21 of the rear awning rod 22. As will be understood tightening of nut 32 will tighten these parts together and securely hold the awning in position upon these brackets in such manner that the awning cannot be removed from the brackets until nut 32 is loosened, and yet the awning may be rotated in the collar and bracket as desired for adjusting purposes.

As will be understood in Fig. 5 the awning may be mounted upon a pair of these brackets by first securing one of the brackets to one of the drain gutters, then inserting the collar 26 to have its portions 28 and 29 seated in the depressions 24 and 23. The projecting end 21 of the awning rod 22 is then passed through the opening 27 in the collar and through the inner end of the slot 20, after which the washer 31 and the nut 32 are applied. Tightening of nut 32 will then tighten these parts together so that the inner face of the collar will have its radial groove 30 seated against the outer face of the awning side frame member.

The bracket on the other side of the windshield may be attached by first sliding collar 26 over the extending end 21 of the rod 22, then sliding the extending end 21 laterally through slot 20, then sliding this bracket inwardly to seat the outer collar face in the depressions of the bracket head, then moving these parts to position groove 30 over the outer face of the awning side frame member, then apply washer 31 and nut 32 which nut may be tightened to clamp these parts together after which this bracket may be fixed in position on the drain gutter by properly positioning it thereon and then tightening it thereto by driving the wedge plate 11 longitudinally and tightening nuts 16 and 17.

Having described my invention, I claim:

1. An awning support for supporting one end of an awning in the desired position with respect to the windshield of an automobile having drain gutters adjacent said windshield, comprising a sheet metal bracket having means for adjustably and detachably securing it to a drain gutter, one end of said bracket having a head formed on one of its side faces with a depression, said head having a slot extending from its edge into said depression and adapted to receive a projecting end of an awning rear rod, an annular collar adapted to be mounted on said rod projecting end and enter into said depression, and means for clamping said collar in said depression to prevent said rod end from being moved laterally outwardly through said slot, said collar having axially opposite parallel bearing faces.

2. An awning support as claimed in claim 1, in which said depression is formed in the inner face of the head, and said clamping means is a nut adapted to be threaded onto said rod projecting end to clamp said bracket head and collar against a projection on said rod, said collar being in the form of a one-piece thick washer bearing on one face against the inner face of said depression and on its opposite face against the edge of the awning in a direction axially of said rod end.

3. In a bracket as claimed in claim 2, a thick washer-like collar adapted to be seated in said depression and having an opening concentric with the depression and the curved end of the slot, said collar having axially opposite parallel bearing faces.

4. A bracket as claimed in claim 2, in which said depression is formed of two parts one extending farther into the head than the other and said two parts being concentric and adapted to receive a complementally shaped face of a collar to be inserted into said depression for holding an awning rod in position in said slot and against removal therefrom, the inner faces of the two parts of the depression being parallel, and the outer faces of the complementally shaped collar respectively bearing flatly against the corresponding faces of the depression.

5. An awning support for supporting an awning in position with relation to the windshield of an automobile having drain gutters adjacent said windshield, comprising, a pair of brackets adapted to be clamped to the gutters on each side of the windshield, each of said brackets having a rearwardly extending portion terminating in a head having a depression on its inner face and a slot extending from one edge of the head to slightly beyond the center of the depression, the awning having at each of its rear outer corners an outwardly extending rod-like projection and at each of its sides a forwardly extending frame member connected with said rod-like projections, an apertured collar on each of said rod-like projections inside of the adjacent head, each of said collars extending on its outer face into the depression of the adjacent head and bearing at its inner side against the adjacent frame member, and a nut threaded on the outer end of each of said rod-like projections to clamp the head against the collar and the collar against the adjacent frame member with the rod-like projections rotatably seated in the inner end of said slots.

6. Apparatus of the character described for supporting an automobile awning, comprising: a bracket for supporting an end of an automobile awning, comprising a sheet metal body portion having a head integrally formed on its rear end, said head being pressed laterally to form two concentric depressions, the diametrically inner one being deeper than the outer one, said head having a slot extending from its edge into the inner depression and having on its inner end a curvature concentric with said depressions; and a collar having an opening of approximately the same radius as the radius of the curved end of the slot, said collar on one side having two parallel faces to fit flatly into said two concentric depressions, and said collar being formed in the opposite side with a groove for being positioned over a side frame of said awning.

HUNTINGTON R. SCHLAGEL.

REFERENCES CITED

The following references are of record in the file of this patent:

UNITED STATES PATENTS

| Number | Name | Date |
|---|---|---|
| 1,444,966 | Gagnier | Feb. 13, 1923 |
| 1,461,285 | Olsen | July 10, 1923 |
| 1,494,863 | Notman | May 20, 1924 |
| 2,180,909 | Peckat | Nov. 21, 1939 |